United States Patent
Ziegler et al.

(10) Patent No.: US 6,244,275 B1
(45) Date of Patent: Jun. 12, 2001

(54) METHOD AND DEVICE FOR CONTROLLING PROCESSING OF THE INSIDE AREAS OF BOTTLES OR THE LIKE

(75) Inventors: Manfred Ziegler, Ruderting; Klaus Plschek, Worth/Donau, both of (DE)

(73) Assignee: Krones AG

( * ) Notice: Subject to any disclaimer, the term of this patent is extended or adjusted under 35 U.S.C. 154(b) by 0 days.

(21) Appl. No.: 09/194,100

(22) PCT Filed: Apr. 7, 1998

(86) PCT No.: PCT/EP98/02002

§ 371 Date: Jan. 25, 1999

§ 102(e) Date: Jan. 25, 1999

(87) PCT Pub. No.: WO98/45060

PCT Pub. Date: Oct. 15, 1998

(30) Foreign Application Priority Data

Jul. 4, 1997 (DE) .............................................. 197 14 249

(51) Int. Cl.[7] ................. B08B 7/04; B08B 9/20
(52) U.S. Cl. .......................... 134/18; 134/22.1; 134/57 R; 134/152; 134/167 R; 134/113
(58) Field of Search ........................ 134/18, 22.1, 22.18, 134/57 R, 113, 167 R, 168 R, 152

(56) References Cited

U.S. PATENT DOCUMENTS

| | | | |
|---|---|---|---|
| 2,763,564 | * | 9/1956 | Mckenzie et al. ................. 134/152 |
| 2,970,561 | | 2/1961 | Ashwood ............................ 116/117 |
| 4,104,081 | * | 8/1978 | Totten ................................ 134/152 |
| 4,142,539 | * | 3/1979 | Shih et al. .......................... 134/113 |
| 5,092,356 | * | 3/1992 | Grot ................................ 134/167 R |
| 5,396,178 | * | 3/1995 | Rybarski ............................ 134/113 |
| 5,706,842 | * | 1/1998 | Caimi et al. ................... 134/167 R |

FOREIGN PATENT DOCUMENTS

| | | |
|---|---|---|
| 3722059 | 8/1988 | (DE) . |
| 4036950 | 5/1992 | (DE) . |
| 4232323 | 3/1994 | (DE) . |
| 4427577 | 2/1996 | (DE) . |
| 128708 | 12/1984 | (EP) . |
| 08108160 | 4/1999 | (JP) . |

\* cited by examiner

*Primary Examiner*—Randy Gulakowski
*Assistant Examiner*—Saeed Chaudhry
(74) *Attorney, Agent, or Firm*—Tilton, Fallon, Lungmus & Chestnut

(57) ABSTRACT

A method and a device for the control of the treatment of the interior of bottles or similar containers, where the introduction of the fluid into the interior occurs by means of a nozzle presenting an exit opening, and a control is performed to determine the presence of a fluid jet in the area after the exit opening and/or the fluid inlet leading to the exit opening.

30 Claims, 3 Drawing Sheets

METHOD AND DEVICE FOR CONTROLLING PROCESSING OF THE INSIDE AREAS OF BOTTLES OR THE LIKE

FIELD OF THE INVENTION

The invention relates to a method and a device controlling the treatment, e.g., cleaning, sterilizing, and pre-filling, of the interior of the bottles for the performance of the method.

BACKGROUND OF THE INVENTION

Before being filled with a liquid food or other products, bottles or similar containers are usually subjected to several preliminary treatment steps, particularly to a thorough cleaning and optionally sterilization. To improve the microbiological quality of filled liquid foods, it is known to sterilize the bottles with heat, prior to the filling operation, to kill any germs that may be present and that are dangerous to the food in question. This occurs, in general, by the introduction of steam, hot water or superheated water into the bottle to be sterilized by means of a sterilization installation with spray nozzles, which installation is generally connected as a separate machine before a filling machine, or, in individual cases, it is integrated into the filling machine. However, an incorrect course of the process cannot be completely ruled out. Thus, as a result of a failure of control valves, or insufficient pressure, the killing of the germs in the bottle to be sterilized can be insufficient, or completely absent.

From DE 42 32 323 A1, an installation is known for monitoring the thermal treatment of bottles in a bottle treatment machine. In this process, a first sensor is used, which measures the heat radiation emitted by the external surface of the bottle after the sterilization. In the area of introduction of the bottles, before they reach the sterilization installation, the bottles pass a second sensor, which also works on the principle of a pyrometer. An electronic control unit, to which the first and second sensors are connected, determines whether the temperature measured by the first sensor is enough for sufficient sterilization. Such a measuring system requires extensive apparatuses, resulting in high manufacturing costs. In addition, after a time of exposure to steam of only one to two seconds, the temperature increase on the external side of the bottles is extremely small, and it can only be determined with difficulty by the measuring technology. If the treatment of the bottles is carried out with gas or chemical means, for example, ozonizing water, whose temperature is not higher than the temperature of the bottle, or only insignificantly higher than the temperature of the bottle, at the beginning of the treatment, then the known temperature control installation for monitoring the sterilization process is completely unsuited, because in this case there is no detectable temperature increase of the bottle wall.

SUMMARY OF THE INVENTION

The task of the present invention is to indicate, in contrast, a reliable and simplified method and a corresponding installation for controlling the treatment of the interior of bottles.

This task is solved by performing a control to determine the presence of the fluid jet in the area after the exit opening and/or the fluid inlet to the exit opening of the spray nozzles.

If the nozzle which delivers the treatment fluid in the operating phase is at an interval from the bottle mouth, then the fluid jet which exits out of the nozzle opening in the area between the bottle mouth and the nozzle opening can be directly recognized and controlled by a sensor installation. Using a laser beam it is possible, for example, to reliably sense a steam or liquid jet. It should be understood, that the type of the control installation to be used also depends on the type of fluid that is used.

If a so-called "submerged nozzle" is necessary for the treatment of the interior of the bottle, i.e., if a nozzle exit opening is located, at the time of the fluid delivery, behind the bottle mouth in the interior of the bottle, then it is possible to check the fluid inlet to the outlet opening of the nozzle in a simple manner, to sense the occurrence of the treatment of the interior, for example, by querying the position of a flow restrictor which is led in a movable manner in the inlet line by means of the control installation. This control method is particularly advantageous in the case of a treatment with a gaseous fluid (sterile air, $CO_2$), because in this case, the above mentioned direct determination of the jet could, under certain circumstances, require a more extensive setup of sensors. It should be understood that the fluid inlet control is not only limited to application cases with submerged nozzles, rather, it is particularly suited in the case of a gaseous or steam-phase treatment fluid, and also for nozzles in which a direct jet control would be possible because of an interval between the nozzle exit opening and the bottle mouth.

In the machines used for the treatment of the interior of bottles, for example, in the rinsing apparatuses that are used in practice, the predominant approach is to use a multitude of nozzles which are distributed at regular intervals on a support which can be moved so that the nozzles move synchronously with the bottle over a certain section of the path, where the bottles are in a position, during the treatment of the interior, such that the bottle mouth is generally pointed towards the bottom, whereas the fluid jet is introduced from the bottom to the top toward the bottom of the floor in the interior.

Ideally, every nozzle is associated with a sensor device which advances simultaneously, for the direct control of the presence of the fluid jet and/or fluid inlet, where, advantageously, the entire treatment process can be tested over its entire duration. However, with stationary sensor devices which are positioned on the circulation path of the nozzle, a sufficient and reliable control of the treatment of the interior of bottles or similar containers, and at low cost, is possible in many cases of application. Using suitable means, the state of the sensors is then queried and evaluated at the time of the passage of a nozzle at the place where the fluid treatment should occur, where the querying by the sensor occurs, for example, as a function of the position of the swing angle of one of the rinsing robots which carries the nozzles, or it occurs as a result of a time- and/or path-dependent triggering by means of certain components which are arranged at regular intervals on the rinsing apparatus (for example, nozzle or bottle retainer parts) taking into account the instantaneous speed of a machine. To recognize such components, the sensors themselves can be used, so that it is not absolutely necessary to provide additional trigger sensors.

This solution with stationary sensory devices can also be used, without any problems, for controlling treatment processes with multiple fluid types, optionally successively with different fluid types, for the treatment with fluid of the bottles. One must only make sure that in each treatment area, where fluid is to be applied to a bottle, at least one sensor device is provided for each nozzle circuit path.

As a rule, the treatment of the interior of the bottle is followed by the filling of the bottle with the intended filling products, for example, a drink. For this purpose, a treated bottle is transferred from the rinsing apparatus to a filling machine. This transfer can occur using a conveyor belt or star wheels. When the filling of the bottle must take place under sterile or aseptic condition in the filling machine, it is particularly advantageous if the bottles, whose interior treatment was determined to have been unsatisfactory by the sensors, so that harmful germs, spores, fungi, etc., can still be present, are removed from circulation before reaching the filling machine, in order to prevent infection of the sterile area. This measure is independent of the type of sensors used for controlling the treatment of the interior. To remove unsatisfactory bottles from circulation it is possible, for example, to use a transfer star wheel with selectively controllable retainer devices, for example, grippers, where the control occurs as a function of the signals of the evaluation installation, which recognizes, from querying the sensory devices, the presence of an incorrectly treated bottle, and which generates an error or removal signal.

BRIEF DESCRIPTION OF THE DRAWINGS

Below, embodiment examples of the invention are explained with reference to the drawings, in which.

DETAILED DESCRIPTION OF THIS PREFERRED EMBODIMENT

Figure 1:
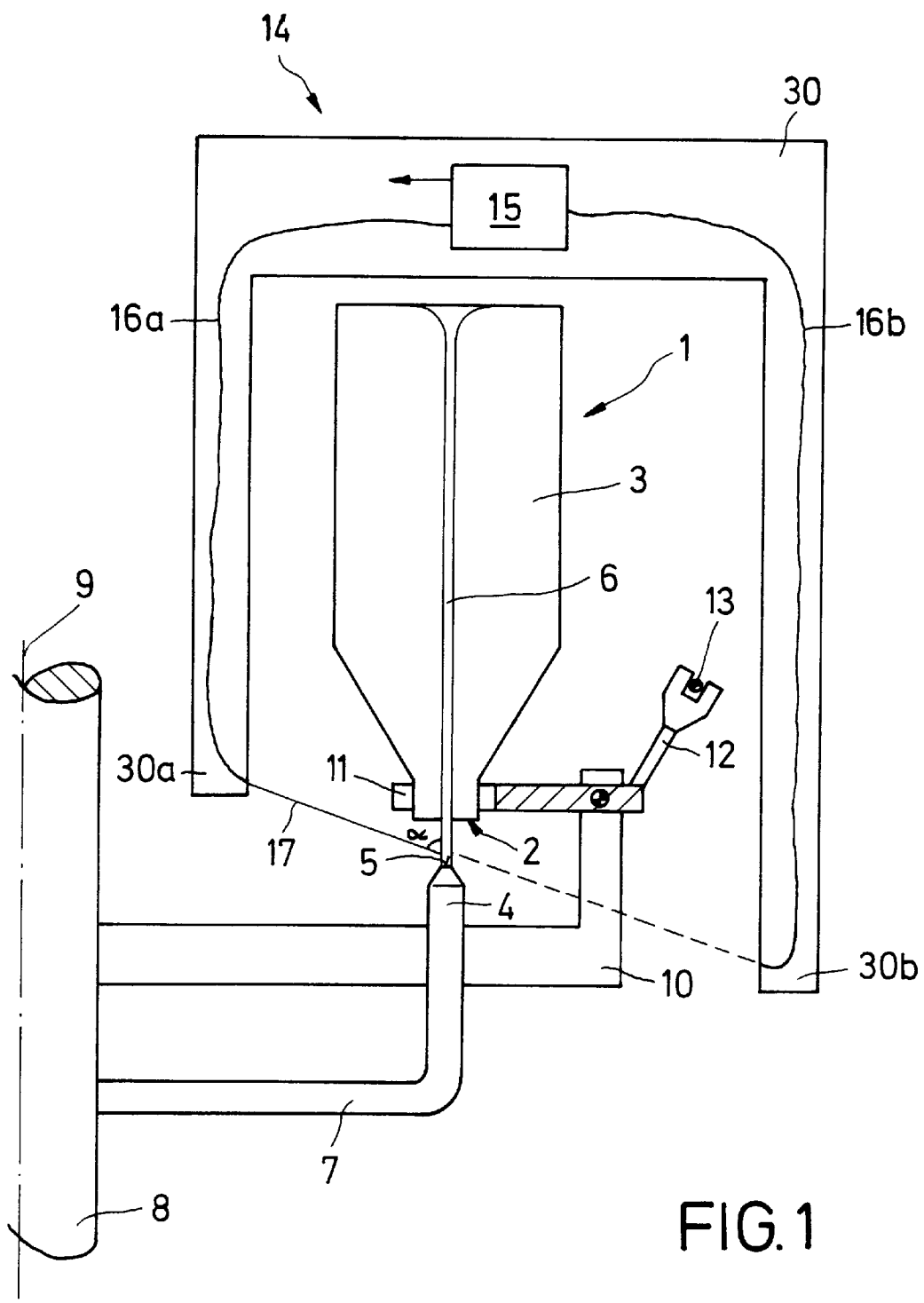
FIG. 1 is a schematic vertical section through the external periphery of a rinsing apparatus with a bottle in the treatment position and a control installation according to a first embodiment.

The bottle 1 represented in FIG. 1 in the treatment position, is held in a position pointing towards the bottom by a gripper 11, for example, made of a plastic, where the bottle mouth 2 points towards the bottom. The gripper 11 is attached, in a manner which allows tilting, to an L-shaped carrier 10, which is attached by its radial internal end to a rotor 8 which turns around a rotor rotation axle 9. The position of the tiltable gripper 11 is determined by a fork head 12 which is connected to it, and which has a slit end which surrounds a control rod 13 which is bent according to the desired tilt program. A nozzle 4 with a nozzle exit opening 5 is also attached to the rotor 8, below the bottle mouth 2 by means of an inlet line 7, in such a manner that a fluid jet 6 which is sprayed upward out of the nozzle exit opening 5, passes by the bottle mouth 2 in an approximately concentric manner, and it penetrates into the bottle interior 3, where an interval exists between the bottle mouth 2 and the nozzle exit opening 5. The fluid supply, from a rotating distributor which is arranged in the rotor 8, not shown, through the inlet line 7 leading to the nozzle exit opening 5, is controlled in a known manner by a control slit of a rotating pusher, not shown, or by valves, also not shown.

Furthermore, a control installation 14, represented with a U-shaped housing 30, is present, where the base of the housing is located above the bottle 1, and two vertical legs with different lengths 30a, 30b extend downward to the level of the nozzle exit opening 5. A transmitter-receiver evaluation apparatus 15 is located in the base, which apparatus can emit, through a first light wave guide 16a, a laser beam 17 which runs diagonally with respect to the fluid jet 6, and which, if not interrupted, is received by a second light wave guide 16b, located opposite, and then it is led back to the receiver arranged in the evaluation apparatus 15. If the fluid jet 6 is present, the laser beam 17 is interrupted, or in the case of a fluid, such as sterile water, which is transparent, it is deflected because of its slope angle α by double refraction in such a manner that it is no longer received by the second light wave guide 16b. A slope angle α of 50–60° is particularly advantageous. The parts which belong to the control installation 14 can either be arranged in a stationary setup, or they can be each assigned to one nozzle 4, and move with it in the circulation, for example, by attaching the house of the control installation 14 to the continuously circulating carrier 10.

In the stationary embodiment variant of the control installation 14, the querying of the receiver input of the evaluation apparatus 15 occurs at the time when the fluid jet 6 which exits from the exit opening 5 would intersect the laser beam 17. If the nozzle 4 delivers, as intended, a fluid jet 6, the exiting laser beam 17 is interrupted or deflected as it leaves the light guide 16a (see FIG. 1). However, if no fluid jet 6 is present at that time, the laser jet 17 can pass unimpeded through the slit between the bottle opening 2 and the nozzle exit opening 5, it is received by the second light wave guide 16b, and led to the receiver of the evaluation apparatus 15, which in turn issues an error signal for the removal of the corresponding bottle 1.

Figure 2:
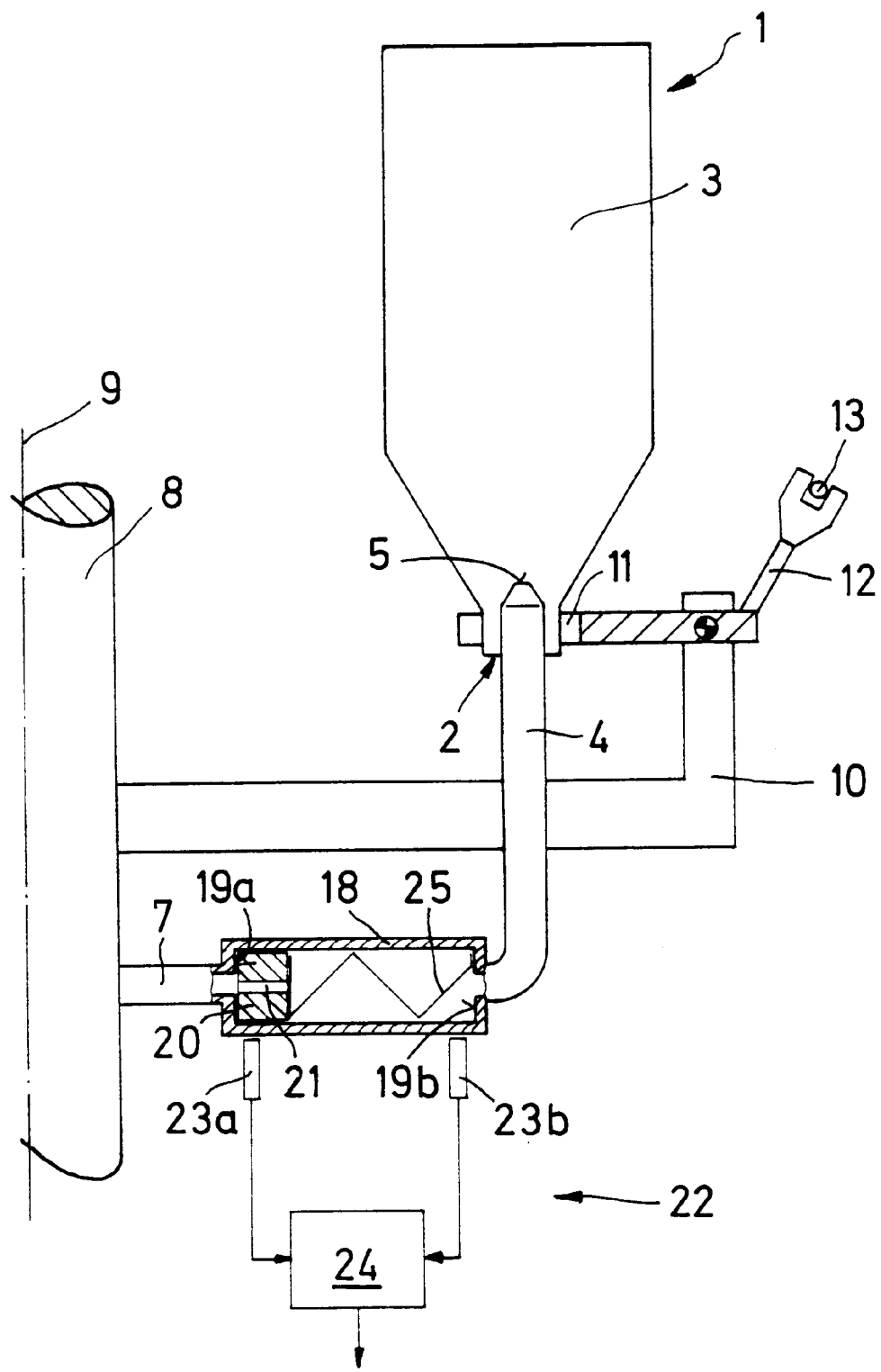
FIG. 2 is a schematic vertical section through the external periphery of a rinsing apparatus with a bottle in the treatment position and a control installation according to a second embodiment.

The second embodiment example shown in FIG. 2 differs from the previous one (FIG. 1) in that it has another control installation 22, by means of which the fluid supply in the inlet line 7 leading to the nozzle exit opening 5 can be checked. For this purpose, the inlet line 7 has a tube section 18, in which a flow restrictor 20, with an internal bore 21, is led so it can move axially between two abutments 19a and 19b located at a distance from each other. By means of a pressure spring 25, pressure is applied to the flow restrictor 20 in the direction towards the first abutments 19a. Two sensors 23a and 23b are located on the external side of the tube section 18, where the first sensor 23 a is close to the first abutment 19a, and the second sensor 23b is in the area of the second abutment 19b. Both the sensors 23a and 23b are connected with a control and evaluation apparatus 24. In the present embodiment, the tube section 18 is made, for example, of a plastic, whereas the flow restrictor 20 is made of special steel. In this case, proximity sensors can be used as sensors.

If there is no fluid supply through the inlet line 7, the flow restrictor 20 is applied, as a result of the force applied to it by the pressure spring 25, to the first abutment 19a, and, as a result, the first proximity sensor 23 a is activated. If now, for the process of rinsing the bottle interior 3 by spraying, fluid is introduced into the inlet line 7, in the direction of the nozzle exit opening 5, then the flow restrictor 20 is lifted away from the abutment 19a, and it is shifted in the direction toward the second abutment 19b, because the cross section of the internal bore 21 is smaller than the cross section of the bore of the inlet line 7 leading to the tube section 18. If the fluid pressure conforms to the regulation in the inlet line 7, then the throttle bottle 20 reaches the final position, defined by the second abutment 19b, against the resistance of the pressure spring 25, where the second proximity sensor 23b is activated, whereas in this position the first proximity sensor 23a is no longer activated.

If, at this moment, while the process of rinsing by spraying should take place, the evaluation apparatus 24 conducts a query to determine whether the sensors 23a and 23b are activated, then, it is concluded from the activation of the second proximity sensor 23b that the nozzle 4 is functioning properly, that is a fluid jet 6 is delivered into the bottle interior 3. On the other hand, if none of the two sensors 23 are activated at that time, then the flow restrictor 20 is, as a result of an insufficient fluid pressure, in a position between the two sensors, so that an error signal is issued by the evaluation apparatus 24, because it must be assumed that the fluid jet 6 which flows out of the nozzle exit opening 5, does not reach the bottle floor,, under some circumstances, because of insufficient pressure, and consequently the bottom is not sufficiently cleaned or sterilized. If the flow restrictor 20, at the time of the query, is in the area of the sensor 23a, the fluid supplied through the inlet line 7 is not sufficient, and, as a result, an error signal is also issued.

To detect the spray function of the nozzle 4, only one of the two sensors 23a or 23b can also be sufficient.

The tube section 18 can, in contrast to the representation in FIG. 2, also be arranged in the vertical section of the inlet line 7.

As in the first embodiment example according to FIG. 1, the sensors 23a, 23b and the evaluation apparatus 24 can be in a stationary setup, or in a setup so it moves along with the nozzle 4, as desired.

The embodiment example represented in FIG. 2 is particularly well suited for the case of a so-called "submerged nozzle", for example, for applications in which the nozzle exit opening 5 of a nozzle 4 is located in the interior 3 of the bottle during the spray phase. Furthermore, this embodiment is also particularly advantageous if a gaseous or steam-phase fluid is used for the rinsing of the bottles 1 by spraying or blowing, for example, sterile air, $CO_2$, aerosols or salt-containing steam.

Figure 3:
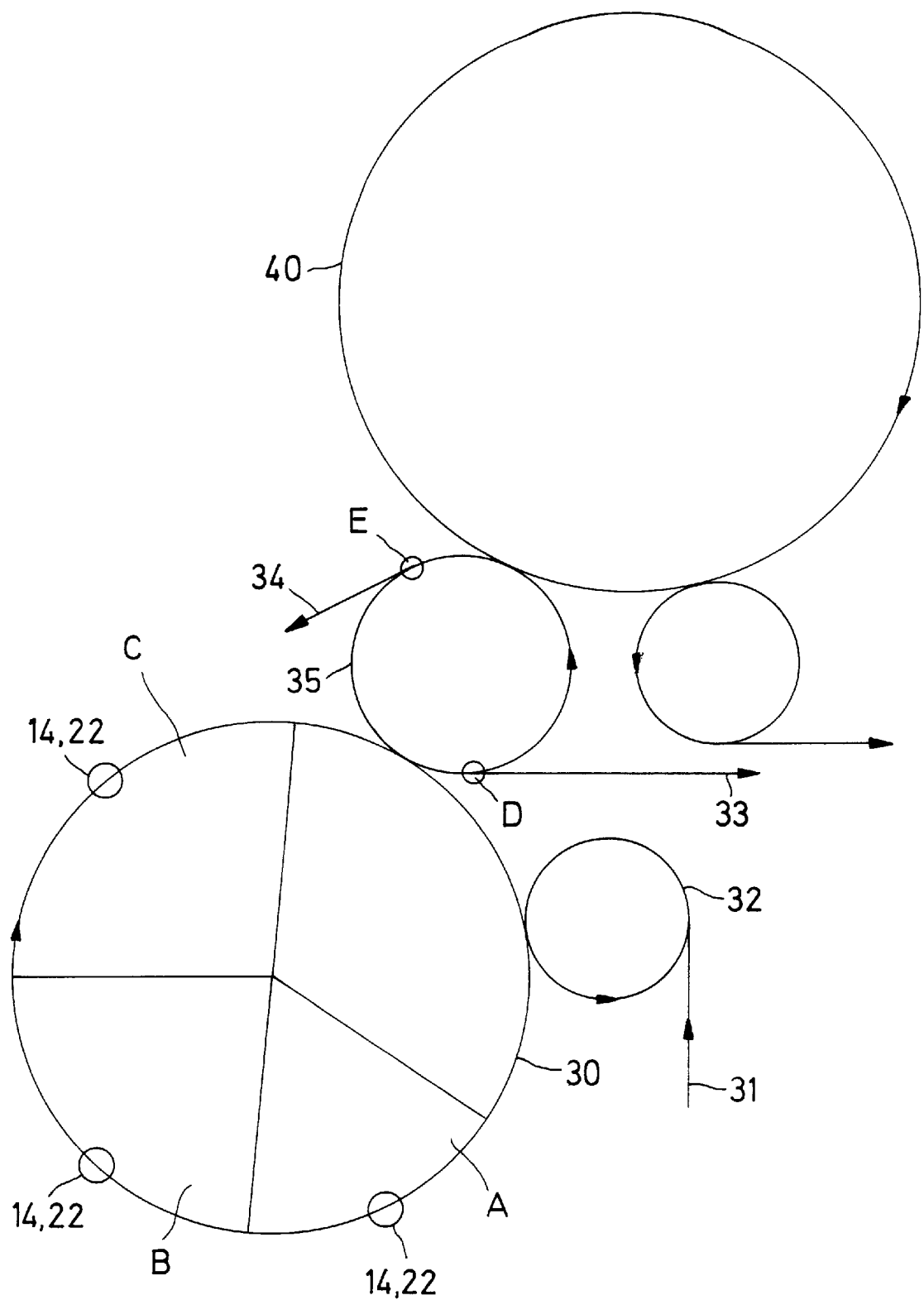
FIG. 3 represents a rinsing apparatus followed by a filling machine, in a schematic top view.

In FIG. 3, a top view of the carousel of a rinsing apparatus is indicated by a circle 30, and a filler carousel is indicated by a circle 40. A transfer star wheel 35 is located in-between; on its circumference, it is equipped with retainer devices, for example, grippers, which can be controlled, and which in themselves are known. The bottles to be treated are led from a conveyor 31 into an inlet star wheel 32, which transfers the bottle to the rinsing apparatus carousel 30. Then, the bottles are tilted by the rinsing apparatus in a manner which in itself is known by approximately 180°, until the bottle mouth points towards the bottom. In this position, every bottle passes, for example, through three successive treatment sectors A, B and C, and the interior of each bottle is subjected to an application of another fluid as it passes through these sectors. To be able to control that the treatment of the interior of the individual bottles has taken place as intended in the three sectors A, B and C, the stationary arranged control installation 14 according to FIG. 1 or 22 according to FIG. 2 is located in each one of the sectors in the circulation track of the rinsing apparatus carousel 30, for example. After the bottles leave the last sector C, and before they reach the transfer wheel 35, they are tilted back to the original position, and then they are transferred to the wheel.

Removal conveyors 33 or 34, which are used for removing bottles which have not been treated as planned, are located on the circulation track of the transfer star wheel 35, for example, at the places identified with D and/or E, i.e., the individual controllable retainer devices of the transfer start wheel 35 can release unusable bottles, in position D or E, and thus allow their removal.

In this manner it is guaranteed that only bottles that have been properly treated are transferred to the filler carousel 40, located, for example, in a sterile housing. Consequently, a contamination of the filler and its environment can advantageously be prevented.

What is claimed is:

1. Method for the control of the treatment of the interior of bottles or similar containers with a fluid, comprising the steps of: introducing the fluid into the interior by means of a nozzle which has an exit opening, and controlling one of the presence of the fluid jet in the area after the exit opening by a laser beam or the fluid inlet leading to the exit opening by a flow restrictor which can be moved through the fluid, and whose position is controlled.

2. Method according to claim 1, wherein the control of the fluid jet or the fluid inlet occurs in a contact-free manner.

3. Method according to claim 1, wherein said exit opening, at the time of the introduction of the fluid into the interior of a bottle or a similar container, is at an interval from said inlet opening of the interior, and it is in the area of said interval that the presence of said fluid jet is controlled.

4. Method of claim 3, and wherein said fluid jet is controlled by optical means.

5. Method of claim 4, wherein said optical means comprises a light beam.

6. Method according to claim 5, wherein said light beam is oriented at an angle a which differs from 90°, diagonally with respect to said fluid jet.

7. Method according to claim 1, and the step of detecting the fluid movement in the inlet line before the exit opening by a flow restrictor which is led in a movable manner in the inlet line, and whose position is controlled.

8. Method according to claim 1, and in the case of the absence of a fluid jet or fluid inlet, issuing a signal by a control installation.

9. Method according to claim 1, wherein for the purpose of treatment of their interior, holding the bottles or similar containers in a position such that their inlet opening points to the bottom, and the fluid jet flows in the direction from the bottom to the top in the interior.

10. Method according to claim 1, wherein it is used with a continuously rinsing apparatus and wherein the treatment with the fluid sterilizes the interior of a bottle or similar container.

11. Method of claim 10, and wherein said rinsing apparatus has continuous circulation.

12. Method according to claim 1, wherein when the control of the treatment of the interior of a bottle or similar container indicates that the result of the treatment is insufficient, the step of removing the corresponding bottle and not leading it to the subsequent filling process.

13. Method for the control of the treatment of the interior of bottles or similar containers with a fluid, comprising the steps of: introducing the fluid into the interior by means of a nozzle which has an exit opening and controlling one of the presence of the fluid jet in the area after the exit opening by a laser beam or the fluid inlet leading to the exit opening, and the step of detecting the fluid movement in the inlet line before the exit opening by a flow restrictor which is led in a movable manner in the inlet line, and whose position is controlled.

14. Method of claim 13, and when subjecting the interior of a bottle or other container several times during a treatment cycle to the application of a fluid, the step of utilizing fluids of different type.

15. Device for the control of the treatment with a fluid of the interior of bottles (1) or similar containers, comprising in combination a nozzle (4) having an exit opening (5) for the introduction of the fluid (6) into the interior (3), and a control installation (14, 22) including sensors (16a, 16b, 23a, 23b) for monitoring the presence of the fluid jet (6) in one of the area after said opening (5) or the fluid inlet leading to said exit opening (5) by a flow restrictor which can be moved through the fluid, and whose position is controlled.

16. Device according to claim 15, wherein said sensors (16a, 16b, 23a, 23b) operate in a contact-free manner.

17. Device according to claim 16, wherein said sensors are one of light barriers (16a, 16b) or proximity sensors (23a, 23b).

18. Device according to claim 15, and including a bottle conveyor track, and, wherein the bottles (1) are moved continuously by means of a transport installation (10, 11), and said sensors (16a, 16b, 23a, 23b) are arranged stationary on said bottle conveyor track (30).

19. Device according to claim 18, wherein said control installation (14, 22), as it passes by said sensors (16a, 16b, 23a, 23b) performs, through a passing bottle, signal query from said sensors, and said control installation issues an error signal in the case of absence of a one of a fluid jet or a fluid inlet.

20. Device according to claim 19, and a bottle removal installation (35) which, as a result of an error signal, can be actuated for the removal of a bottle which has not been treated or which has been treated insufficiently and wherein said bottle removal installation (35) is arranged in an area before a filling machine (40), whereby said untreated or insufficiently treated bottle is removed at said bottle removal installation instead of being filled by said filling machine.

21. Since according to claim 20, wherein said filling machine is a sterile filling machine.

22. Device according to claim 18, and a transport installation (10, 11) for tilting the bottles for the treatment of their interior from a vertical position into a position where the bottle mouth (2) essentially points to the bottom, in which position the mouth (2) is arranged concentrically with respect to said nozzle (4) directed upward.

23. Device according to 22, wherein said nozzle (4) and the mouth (2) of a bottle (1) are separated, during the treatment of the interior, at an interval, and, in the area of said interval, the presence of a fluid jet (6) can be detected by at least one said sensor (16a, 16b).

24. Device according to claim 23, wherein said one sensor comprises a light beam (17) which intersects the fluid jet (6).

25. Device according to claim 24, wherein said one sensors (16a, 16b) are arranged in such a manner that said light beam (17) intersects the fluid jet (6) which is at an angle ($\alpha$) which is different from 90° C., and diagonal with respect to the direction of conveyance.

26. Device according to claim 15, wherein said sensors (16a, 16b) are arranged on a housing (30) which has two parallel legs (30a, 30b) which are separated from each other, and the bottles can be led between said legs.

27. Device according to claim 26, wherein said housing (3) is essentially U-shaped, and said legs (30a, 30b) have different lengths.

28. Device according to claim 15, and a conveyor track of the nozzles (4), in the area of the fluid inlet (7), and said sensors (23a, 23b) are arranged for the sensing of the fluid inlet, and wherein, in a section (18) of the fluid inlet (7), a flow restrictor (20) is arranged which can be moved through a fluid stream, and whose position can be determined by said sensors (23a, 23b).

29. Device according to claim 28, wherein said flow restrictor (20) is made of a metallic material, and the fluid inlet line (7) in the area (18) of said flow restrictor (20) is made of a nonmetallic material.

30. Device according to claim 28 or 29, wherein said nozzle (4) is submerged during the treatment of the interior in the mouth (2) of the bottle (1).

* * * * *

UNITED STATES PATENT AND TRADEMARK OFFICE
CERTIFICATE OF CORRECTION

PATENT NO. : 6,244,275 B1
DATED : June 12, 2001
INVENTOR(S) : Ziegler et al.

It is certified that error appears in the above-identified patent and that said Letters Patent is hereby corrected as shown below:

<u>Claim 6,</u>
Line 2, after "angle" delete "a" substitute -- α --.

Signed and Sealed this

Ninth Day of April, 2002

Attest:

Attesting Officer

JAMES E. ROGAN
*Director of the United States Patent and Trademark Office*